Feb. 17, 1931.   E. G. WATROUS   1,793,201
HOOD FASTENER
Filed Jan. 18, 1927
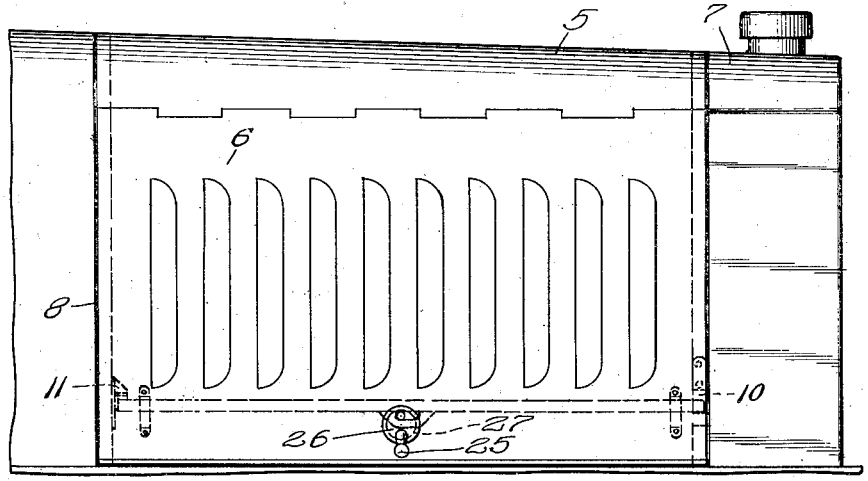
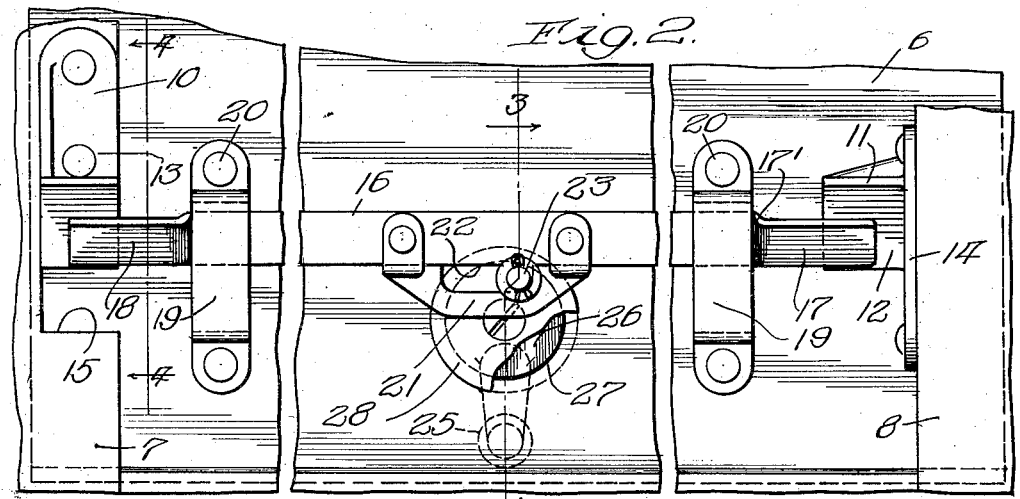
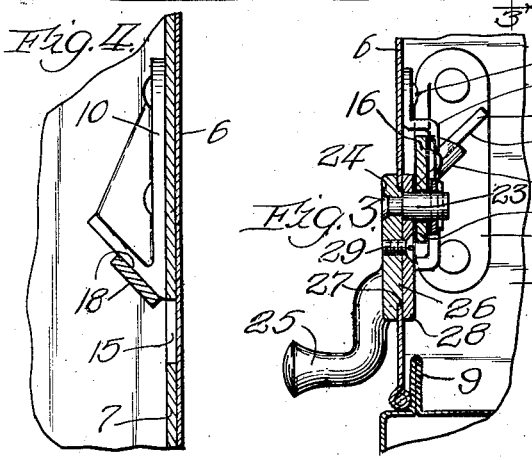
Inventor:
Earl G. Watrous,
By Glenn S. Noble
Atty.

Patented Feb. 17, 1931

1,793,201

UNITED STATES PATENT OFFICE

EARL G. WATROUS, OF CHICAGO, ILLINOIS

HOOD FASTENER

Application filed January 18, 1927. Serial No. 161,760.

This invention relates to means for drawing the hinged sides of an automobile hood closely against the adjacent parts and fastening the same in latched or fastened position. Heretofore automobile hoods have usually been held in closed position by means of spring hooks or other similar devices which are usually placed at each end of the hood. These devices are not only expensive to manufacture and apply but are often awkward to operate and are likely to become loosened and permit the hood to rattle. The present invention is designed to overcome the objectionable features of such prior devices.

The objects of this invention are to provide a new and improved fastening device for motor vehicle hoods; to provide a hood fastener which will be particularly simple in construction and durable and efficient in operation; to provide a fastener having the principal operative parts located within the hood; to provide means for drawing the hood sections down and in against the adjacent parts of the vehicle and fastening them in such position; and to provide such other advantages and improvements in construction as will be described more fully hereinafter.

In the accompanying drawings illustrating a preferred form of my invention;

Figure 1 is a side view of a portion of a vehicle showing my fastener in position;

Figure 2 is an enlarged inside view of the hood, showing the fastener in locked position;

Figure 3 is a sectional view taken on the line 3—3 of Figure 2;

Figure 4 is a sectional view taken on the line 4—4 of Figure 2; and

Figure 5 is a detail of an end of the latch bar.

As shown in these drawings, the hood 5 is intended to illustrate any ordinary or preferred form of such devices having the usual hinged sides 6. The front end of the hood rests on or engages with a supporting portion of the vehicle such as the radiator shell 7, while the rear end rests on a supporting portion of the vehicle, such as the dash or cowl 8. The lower edges of the hood member also engage with a plate or stop 9, all of which may be of the usual construction.

In order to hold the hood in closed position, I provide stops or catches 10 and 11 on the hood supporting portions of the vehicle at the front and back of the hood, respectively. These catches are provided with beveled lower faces 12 and may be secured to the vehicle in any suitable manner, as by means of bolts or rivets, as shown. The front catch 10 comprises a plate portion 13 which is fastened to the radiator shell 7 and has a lug which projects inwardly in order to receive the latch or fastening member. The rear catch 11 comprises a plate 14 which is secured to the inner face of the body portion or cowl 8 and has a rearwardly projecting lug to receive the latch. The edge of the shell may be cut away, as shown at 15, to permit the passage of the end of the latch.

The latch or fastening member comprises a flat metal bar 16 having the ends 17 slightly bent or twisted in order to provide engaging surfaces 18 to coact with correspondingly tapered faces 12 of the catches 10 and 11. The bar or latch 16 is slidably mounted in loops or keepers 19 which are secured to the sides 6 of the hood by means of bolts or rivets 20, and is guided by guide lugs or projections 17'. A bracket or plate 21 is secured to the bar 16, preferably at about the center thereof, to provide a slot or elongated bearing 22 for receiving a crank pin or eccentric pin 23. This pin is carried by a disk 24 having a crank or handle 25 for turning the same. The disk 24 is mounted on the outside of the hood and has a circular projection 26 which engages with a hole 27 in the side of the hood 6. The disk is held in position by means of a washer 28 on the inside of the hood and a screw 29 which passes through the washer and engages with the disk.

The operation of the device will be readily understood from Figure 2. When the hood is to be opened, the handle 25 is turned to move the disk 24 in an anti-clockwise direction, which causes the pin 23 to move to the left so that it first passes the dead center and then presses down on the plate or bracket 21 and carries the bar or latch 16 downwardly until the ends are below the catches 10 and 11. The hood may then be swung out on its hinge in the usual manner. When the hood is to be again latched, it is swung to closed position and the crank handle is then turned in the opposite direction, which causes the pin to press upwardly against the bar 16 and raise it until the ends 17 engage with the catches and first draw the side of the hood closely down and against the adjacent parts of the vehicle, and the continued rotation of the disk moves the pin beyond dead center to the end of the slot 22, where it engages with the plate or bracket and will lock the parts securely in position.

From this description, it will be seen that I provide a fastener by means of which the hood may be easily latched and unlatched by merely turning a small handle and furthermore, there are no parts which are apt to become worn or loosened. The principal portions of the latching mechanism are enclosed in the hood, and the only visible portion, which comprises the disk and handle, may be made ornamental in appearance in order to improve the looks of the vehicle.

It will also be noted that changes may be made in the details of construction and arrangement of parts in order to adapt the fastener to different types of vehicles or different hood constructions; therefore I do not wish to be limited to the exact construction herein shown and described, except as specified in the following claims, in which I claim:

1. A hood fastener comprising two catches adapted to be secured to the vehicle, a single bar adapted to be slidably supported on the hood, and means for actuating the bar to cause it to engage with said catches.

2. In an apparatus of the character set forth, the combination of a pair of fastening members having bevelled faces and adapted to be secured to the vehicle, a bar having bevelled ends for engagement with said fastening members, keepers for adjustably securing the bar to the hood, and means for sliding the bar transversely to the length thereof to cause the ends thereof to engage with said fastening members to cause the hood to be drawn downwardly and also pressed inwardly against its support.

3. The combination with a vehicle, of a pair of bevelled catches secured thereto within the hood, a bar arranged longitudinally within the hood and having bevelled ends for engagement with said catches, keepers for adjustably supporting the bar on the hood, a bracket secured to said bar, a disk rotatably mounted in the hood, a pin on said disk engaging with the bracket and bar, and means for turning said disk.

4. The combination with a vehicle, of a pair of catches secured thereto within the hood, a fastening member slidably mounted on the inner face of the hood and having a slot therein, a disk rotatably mounted in the hood, a pin on said disk engaging with said slot, and means for turning the disk, the arrangement being such that when the disk is turned to fastening position the pin will engage with one end of the slot beyond the vertical center of the disk so as to fasten the parts in position.

5. In a device of the character set forth, the combination of a catch having a bevelled engaging face, means for securing the catch to the radiator shell, a second catch having a bevelled engaging face, means for securing said catch to the cowl, a bar arranged longitudinally within the hood and having bevelled ends for engagement with said catches, keepers for movably supporting the bar in the hood, a rotatable member mounted in the hood and adapted to be actuated from the outer side thereof, and a pin and slot connection between the rotatable member and the bar for actuating the bar.

6. In a hood fastener, the combination with fastening members adapted to be fixed to the car adjacent to the hood and having beveled engaging faces of a bar slidably secured to the hood and having its ends adapted to engage with said faces, and means for actuating the bar for moving it into and out of fastening position whereby the hood is pulled down and simultaneously pulled in by said bar.

7. The combination with a vehicle hood having a swinging member and supports therefor, of catches secured to said supports with bevelled faces projecting inwardly, a bar having correspondingly bevelled ends for engagement with said catches, vertical guides on the hood member for engagement with said bar, shoulders on the bar which engage with the guides to prevent longitudinal movement of the bar, and manually operable means adapted to be actuated from the outside of the hood member for raising and lowering the bar and fastening it in raised position, said bevelled portions being arranged so that the bar will draw the hood member downwardly and inwardly when the bar engages with the catches.

EARL G. WATROUS.